(12) United States Patent
Nagashima et al.

(10) Patent No.: US 7,566,153 B2
(45) Date of Patent: Jul. 28, 2009

(54) VEHICULAR LIGHTING ASSEMBLY

(75) Inventors: Katsuya Nagashima, Tokyo (JP); Yoichi Tatsumi, Tokyo (JP)

(73) Assignee: Stanley Electric Co., Ltd, Tokyo (JP)

( * ) Notice: Subject to any disclaimer, the term of this patent is extended or adjusted under 35 U.S.C. 154(b) by 137 days.

(21) Appl. No.: 11/851,040

(22) Filed: Sep. 6, 2007

(65) Prior Publication Data
US 2008/0219021 A1 Sep. 11, 2008

(30) Foreign Application Priority Data
Sep. 8, 2006 (JP) .............................. 2006-244331

(51) Int. Cl.
*F21V 17/02* (2006.01)
(52) U.S. Cl. ................. 362/512; 362/514; 362/515; 362/525; 362/528; 362/544
(58) Field of Classification Search ................ 362/512, 362/514, 515, 523, 525, 528, 544
See application file for complete search history.

(56) References Cited

U.S. PATENT DOCUMENTS 5,140,504 A * 8/1992 Sato ........................... 362/514
5,209,558 A * 5/1993 Suzuki et al. ............... 362/544
6,758,589 B2 * 7/2004 Hayakawa et al. .......... 362/512

FOREIGN PATENT DOCUMENTS

JP 2005310386 11/2005

* cited by examiner

*Primary Examiner*—Stephen F Husar
(74) *Attorney, Agent, or Firm*—Cermak Kenealy Vaidya & Nakajima llp

(57) ABSTRACT

A vehicular lighting assembly with a reflection mirror formed of a BMC resin is provided which prevents glass fiber in the resin from separating and flying away when the direction of illumination is changed for aiming, which can result in degradation in appearance of the reflector or occurrence of glare. The vehicular lighting assembly can be configured such that a high-beam reflector and a low-beam lighting assembly attachment are formed of a plastic member made of the BMC resin as an integrated lighting assembly holder portion. The low-beam lighting assembly attachment of the lighting assembly holder portion can include a low-beam reflector, ball joints, and an adjusting nut attachment engaged with an adjusting screw, so that it can be aimed. The ball joints and the adjusting nut attachment are formed at their respective positions on an integrated metallic member so that they can be attached as an aiming unit to the low-beam lighting assembly attachment.

20 Claims, 3 Drawing Sheets

VEHICULAR LIGHTING ASSEMBLY

This application claims the priority benefit under 35 U.S.C. § 119 of Japanese Patent Application No. 2006-244331 filed on Sep. 8, 2006, which is hereby incorporated in its entirety by reference.

BACKGROUND

1. Technical Field

The presently disclosed subject matter relates to vehicular lighting assemblies such as headlamps, and in particular to a lighting assembly with a reflector made of a BMC (Bulk Molding Compound) resin, which can realize reductions in assembly steps and maintain its aesthetic appearance and performance.

2. Description of the Related Art

Recently, for example, a plastic member made of newly developed resins referred to as a BMC (Bulk Molding Compound) resin, or a mixture of an unsaturated polyester resin and glass fiber, has been developed. These plastic members provide enhanced heat resistances and thermal expansion coefficients which are almost equivalent to those of metallic members. Thus, it is now possible to employ these types of plastic members, for example, for a reflector in vehicle headlamps which can be formed as a paraboloid of revolution or a spheroid of revolution.

FIG. 1 shows a reflector 90 made of such a resin. In order to form the reflector 90 of the aforementioned resin, the resin is first formed into a shape to suit the reflector 90, such as a paraboloid of revolution or a spheroid of revolution. Then, to enhance the smoothness of the portion used as a reflecting surface of the reflector 90, an appropriate amount of an undercoating resin which has a high viscosity is dispensed onto the inner surface of the reflector 90, and the reflector 90 is then rotated at a high speed.

This allows the undercoating resin to be formed on the inner surface of the reflector 90 as an undercoat film 91 which has a uniform thickness with almost no surface asperities. The undercoat film 91 is then sufficiently dried and hardened with the aforementioned smoothness maintained.

The undercoat film 91 thus obtained, for example, can have a substance such as aluminum or silver deposited thereon in an appropriate thickness by vacuum deposition or the like, thereby forming a mirror surface 92 to provide a reflection mirror 94. Then a light source 93 is placed at a focus of the reflector 90. When the light source 93 is turned on, the reflection mirror 94 reflects light from the light source 93 as collimated beams.

It should be noted that the reflector 90 can be readily shaped as desired when molded of the BMC resin as described above. Taking advantage of this fact, a lighting assembly holder portion 95 having a high-beam reflection mirror 94 may be formed as shown in FIG. 2. The lighting assembly holder portion 95 may be integrally provided with an aiming unit 80, discussed later, a low-beam reflection mirror 97, and the like. In this instance, the low-beam reflection mirror 97 has a reflector 96 and is integrated with an adjusting nut attachment 82 or part of the aiming unit 80. In this manner, a headlamp 70 is formed in an integrated configuration and thus can be attached to vehicles with improved assembly operation (see, for example, Japanese Patent Application Laid-Open No. 2005-310386).

The reflectors 90 and 96 formed of the BMC resin as described above will naturally have a performance as required of the reflectors 90 and 96 in terms of heat resistance or the like. However, a headlamp 70 equipped with these reflectors 90 and 96 would have to be provided with an additional device, or the so-called aiming unit 80 mentioned above, which can be adjusted so as to provide illumination in a prescribed direction when attached to the vehicle body.

In this case, even the BMC resin which has a high heat resistance and a high hardness for resin would lack strength for certain aspects of the headlamp. Accordingly, a metallic member has to be used to separately form those portions that are subject to great heat or stress, such as ball joints 81 of the aiming unit 80 or a connection between the ball joints 81 and the lighting assembly holder portion 95. Then, these metallic portions have to be integrated with the lighting assembly holder portion 95 by screws or the like.

In addition to this, when sliding portions such as hinges or screws are made of the BMC resin, this would cause the glass fiber added to the resin to fly away in the form of powder during sliding. The flying glass fiber would adhere to the mirror surface 92 of the reflectors 90 and 96, causing degradation in appearance and occurrence of glare. Accordingly, from this point of view, those portions such as the aiming unit 80 that require strength have to be formed of a metallic member. This causes the aiming unit 80 to overlap the low-beam reflection mirror 97 when attached to the same position on the lighting assembly holder portion 95, resulting in the entire structure being made more complicated and in an increase in costs.

SUMMARY

According to an aspect of the presently disclosed subject matter, a vehicular lighting assembly can include: a lighting assembly holder portion including a first traveling beam reflector and a second traveling beam lighting assembly attachment that are formed of a plastic member as an integrated lighting assembly holder portion; a second traveling beam reflector provided to the second traveling beam lighting assembly attachment; a ball joint for setting a direction of attachment of the lighting assembly holder portion relative to a vehicle body, the ball joint being provided to the second traveling beam lighting assembly attachment; and an adjusting nut attachment which is provided to the second traveling beam lighting assembly attachment, and attached pivotally to the vehicle body and engaged with an adjusting screw. In this configuration, the ball joint and the adjusting nut attachment can be formed of an integrated metallic member at their respective positions thereon so that they can be attached as an aiming unit to the second traveling beam lighting assembly attachment.

In accordance with another aspect of the disclosed subject matter, the aiming unit can be provided with an attachment for at least part of a component included in a second traveling beam lighting assembly, thereby serving also as at least part of the second traveling beam lighting assembly.

In accordance with yet another aspect of the disclosed subject matter, the plastic member can be made of a Bulk Molding Compound (BMC) resin which is prepared by mixing an unsaturated polyester resin and glass fiber.

In accordance with still another aspect of the disclosed subject matter, the second traveling beam reflector can be provided on the second traveling beam lighting assembly attachment with the aiming unit interposed therebetween.

In accordance with another aspect of the disclosed subject matter, the "first traveling beam" may refer to a high beam, and the "second traveling beam" may refer to a low beam. Therefore, the first traveling beam reflector may be a high beam reflector, the second traveling beam lighting assembly attachment may be a low beam lighting assembly attachment, the second traveling beam reflector may be a low beam reflector, and the second traveling beam lighting assembly may be a low beam lighting assembly.

In accordance with another aspect of the disclosed subject matter, an aiming unit can be formed of a metallic member in which those portions that produce friction with other parts, i.e., the ball joints and adjusting nut attachment are integrated. In addition to this, the aiming unit can be shaped so as to be easily attached to the low-beam reflector that is formed of the BMC resin. This can prevent the glass fiber from being separated from the BMC resin and facilitate the fabrication of the reflection mirror and the aiming unit, thus addressing both the lack in strength and the occurrence of glare.

BRIEF DESCRIPTION OF THE DRAWINGS

These and other characteristics, features, and advantages of the presently disclosed subject matter will become clear from the following description with reference to the accompanying drawings, wherein.

DETAILED DESCRIPTION OF EXEMPLARY EMBODIMENTS

Figure 1:
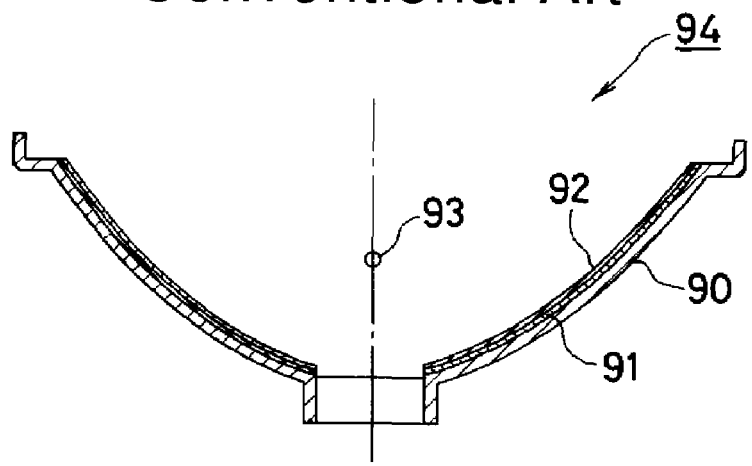
FIG. 1 is a cross-sectional view illustrating a conventional reflection mirror made of a BMC resin.
Figure 2:
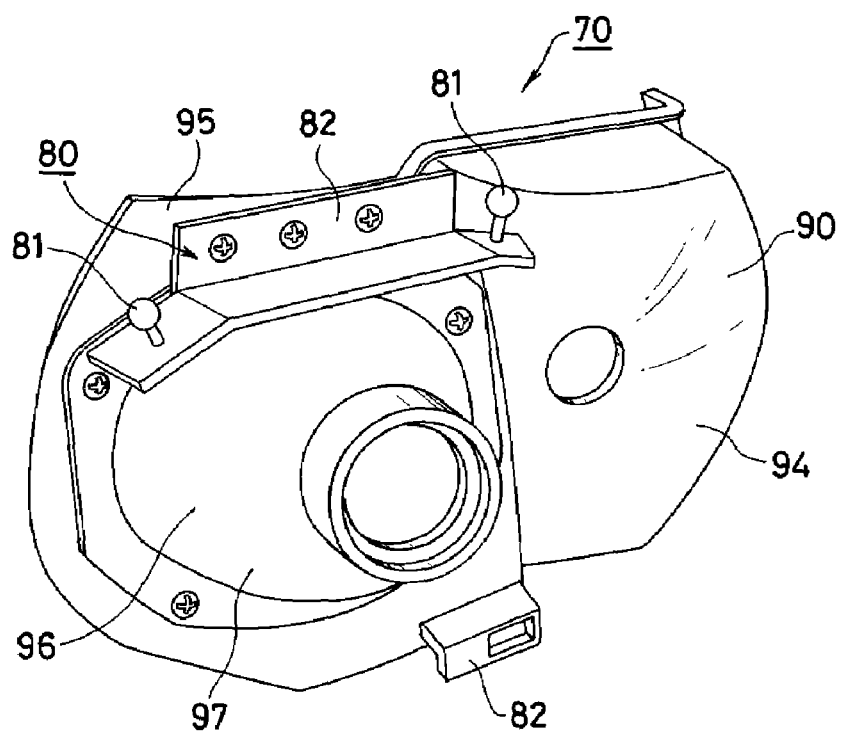
FIG. 2 is a perspective rear view illustrating a fabricated vehicular lighting assembly which employs a conventional reflection mirror made of BMC resin.
Figure 3:
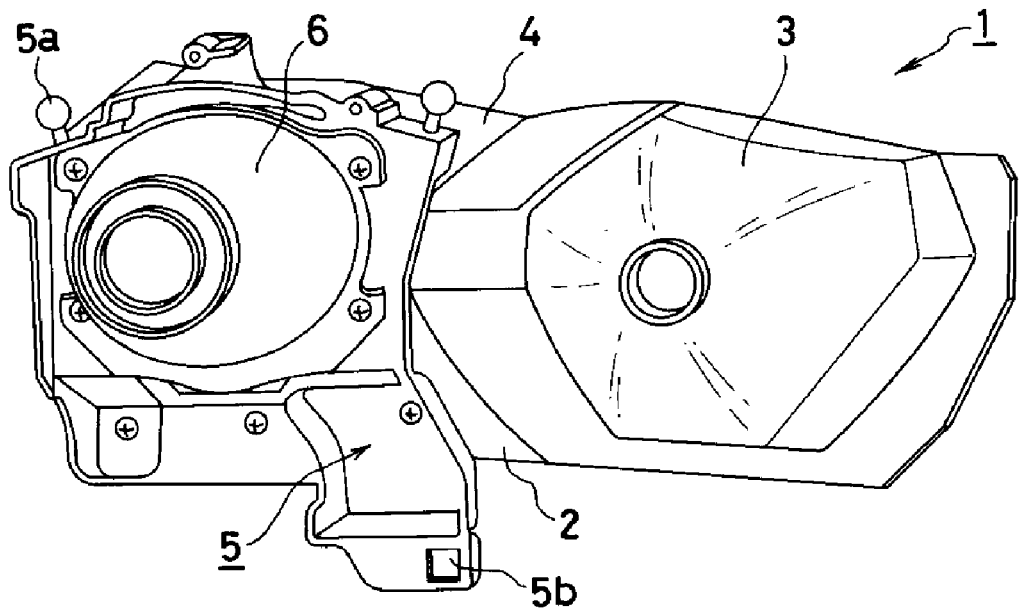
FIG. 3 is a perspective rear view illustrating a fabricated vehicular lighting assembly made in accordance with principles of the presently disclosed subject matter.

A description will now be given of exemplary embodiments that are constructed in accordance with principles of the presently disclosed subject matter with reference to the accompanying drawings. With reference to FIG. 3, the reference numeral 1 generally denotes a vehicular lighting assembly. The vehicular lighting assembly 1 can be configured such that a high-beam reflector 3 and a low-beam lighting assembly attachment 4 are formed side by side on a lighting assembly holder portion 2 made of a BMC resin along the designed orientation on a vehicle, for example, in the horizontal orientation. It should be appreciated that, in this arrangement, the high-beam reflector 3 is also shaped along the designed orientation on the vehicle.

In accordance with principles of the presently disclosed subject matter, the low-beam lighting assembly attachment 4 can be attached with or include an aiming unit 5. The aiming unit 5 can be configured as a metallic member on which at least one pivot projection, such as two ball joints 5a, and an adjusting nut attachment 5b are integrated. Alternatively, the pivot projection can be configured as a hinge, slide unit, etc., via which a user can move the aiming unit 5 relative to the vehicle. In this instance, the aiming unit 5 can typically be formed by die casting with aluminum or the like. Then, the low-beam lighting assembly attachment 4 can be attached with the aiming unit 5, and furthermore, with a low-beam reflector 6 via the aiming unit 5.

Figure 4:
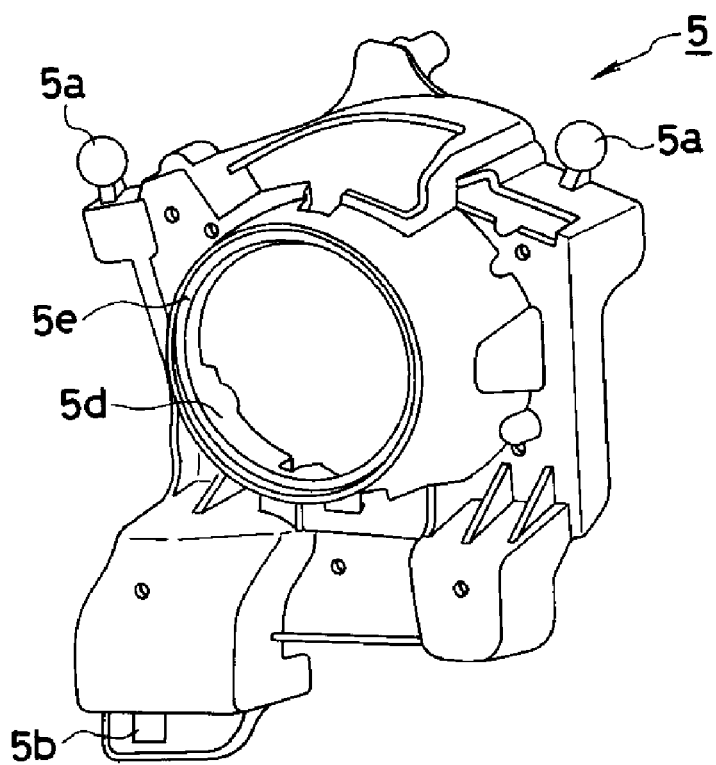
FIG. 4 is a perspective rear view illustrating an aiming unit of a vehicular lighting assembly made in accordance with principles of the presently disclosed subject matter.
Figure 5:
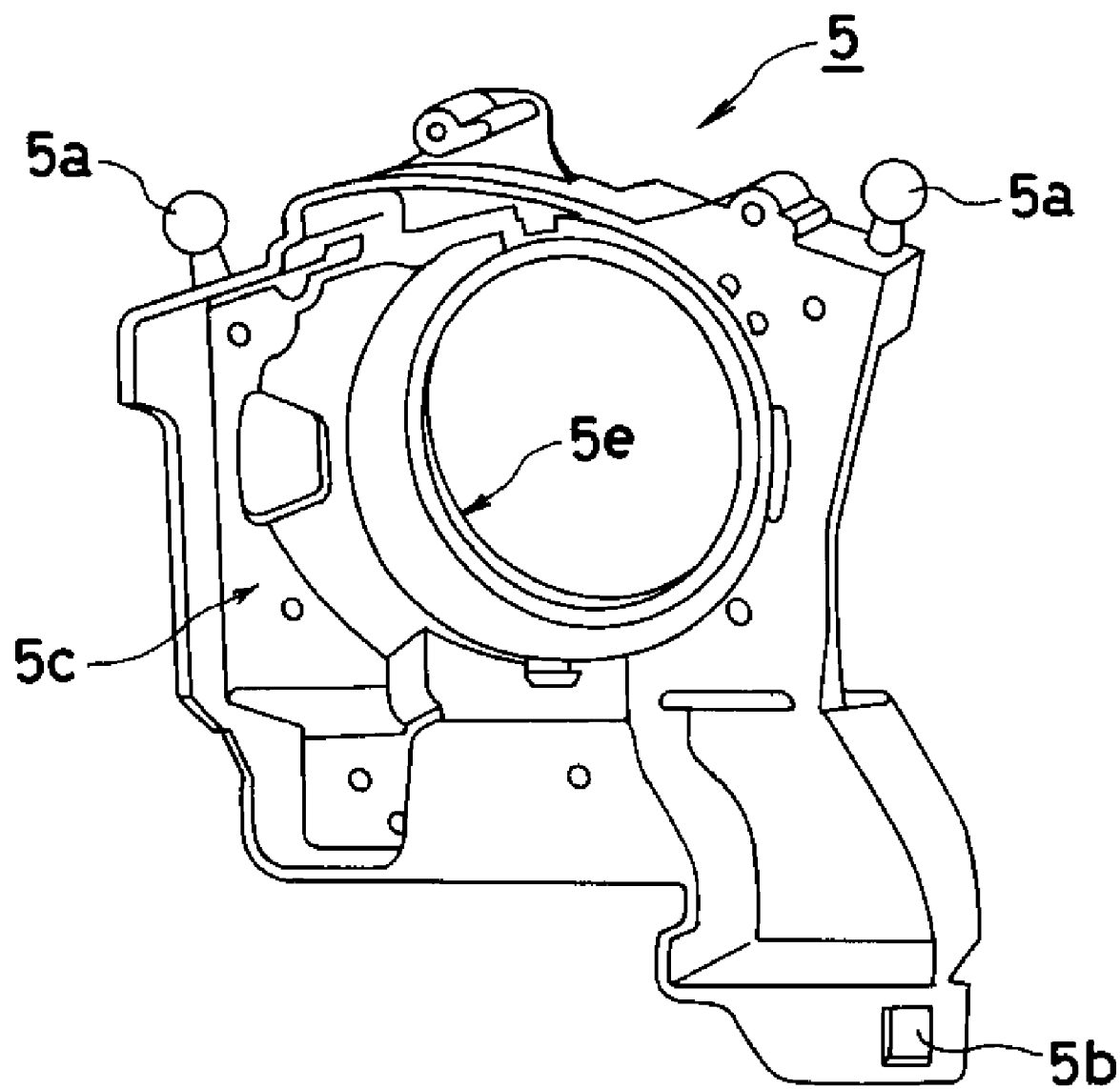
FIG. 5 is a perspective front view illustrating the aiming unit of FIG. 4.

On the other hand, as shown in both FIG. 4 and FIG. 5, the aiming unit 5 can be provided with a low-beam reflector attachment 5c, a shade attachment 5d, and a projection lens attachment 5e that also serve as part of the low-beam lighting assembly. Accordingly, the step of attaching the aiming unit 5 to a predetermined position on the lighting assembly holder portion 2 (being the low-beam lighting assembly attachment 4) can serve also as part of the step of fabricating the low-beam lighting assembly.

Thus a prescribed fabrication procedure can be employed for attachment of each component, thereby allowing the aiming unit 5 and the low-beam lighting assembly to be installed in place through a relatively simple process. For example, components such as a shade that are to be attached to the inside of the low-beam lighting assembly may be attached in advance to the aiming unit 5 (e.g., to the shade attachment 5d of the aiming unit 5). This aiming unit 5 can be attached to the low-beam lighting assembly attachment 4. Thereafter, those components such as a projection lens and the low-beam reflector 6 which are externally attachable parts can be attached to a predetermined portion of the aiming unit 5 to complete the assembly process. During this process, a light source may also be attached to the high-beam reflector 3, and thus the vehicular lighting assembly 1 is almost completed except for an outer lens.

With this arrangement, the vehicular lighting assembly 1 can be attached to the vehicle body (not shown) with the pair of ball joints 5a, so that the lighting assembly holder portion 2 is pivotable within the range of predetermined angles about the line connecting the pair of ball joints 5a. In this instance, an adjusting nut (not shown) engaged with an adjusting screw (not shown) that is rotatably secured to the vehicle body can be attached to the adjusting nut attachment 5b. In this configuration, the adjusting screw may be turned to the left or right as appropriate to provide the lighting assembly holder portion 2 with an ascending vertical angle or a descending vertical angle as desired.

Since the lighting assembly holder portion 2 is provided with both a high-beam reflector 3 and a low-beam reflector 6, aiming can be performed at the same angle regardless of whether illumination is being provided using either the high beam optical system or the low beam optical system. The vehicular lighting assembly according to the disclosed subject matter is also applicable in conjunction with a leveling system which may be recently used in vehicles in order to compensate for a variation in weight of cargo in a vehicle. In particular, a variation in weight can lead to a change in the amount of operation of the front and rear suspensions, resulting in the direction of illumination being raised due to excessive cargo in the trunk or other portion of the vehicle.

As described above, in accordance with the principles of the presently disclosed subject matter, the pair of ball joints and the adjusting nut attachment can integrally be formed of a metallic member at their respective predetermined positions to serve as the aiming unit 5, thereby providing a sufficient strength. It is also possible to prevent the glass fiber added to the BMC resin from being separated due to friction between components and adhered to the reflector thus causing degradation in its appearance and occurrence of glare.

Additionally, in accordance with the principles of the presently disclosed subject matter, the aiming unit 5 is provided with the low-beam reflector attachment 5c, the shade attachment 5d, and the projection lens attachment 5e to serve as part of the arrangement of the low-beam lighting assembly. This allows a simplified arrangement which will prevents positional or inter-fabrication-step interference between the low-beam lighting assembly and the aiming unit 5 which are attached to almost the same position on the lighting assembly holder portion 2.

Furthermore, as described above, since the principles of the presently disclosed subject matter prevents friction between different parts of the vehicle light assembly, contamination of the inner surface of the lighting assembly by glass fiber resulting in the occurrence of glare even when a reflector made of a BMC resin is employed can be prevented. Accordingly, it is now possible to form reflectors in original shapes more easily than when forming them of a metallic material, and it is possible to enhance the appearance of the entire vehicle.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. All conventional art references described above are hereby incorporated in their entireties by reference.

What is claimed is:

1. A vehicular lighting assembly for attachment to a vehicle comprising:
   a lighting assembly holder portion including a first traveling beam reflector and a second traveling beam lighting assembly attachment that are formed as an integral plastic member;
   a second traveling beam reflector located adjacent the second traveling beam lighting assembly attachment;
   a ball joint configured for setting a direction of attachment of the lighting assembly holder portion relative to the vehicle, the ball joint being located adjacent the second traveling beam lighting assembly attachment; and
   an adjusting nut attachment located adjacent the second traveling beam lighting assembly attachment and configured for pivotal attachment to the vehicle and for engagement with an adjusting screw, wherein
   the ball joint and the adjusting nut attachment are formed of an integral metallic member to provide an aiming unit attached to the second traveling beam lighting assembly attachment.

2. The vehicular lighting assembly according to claim 1, wherein the aiming unit is attached to at least part of the second traveling beam lighting assembly, thereby serving also as at least part of the second traveling beam lighting assembly.

3. The vehicular lighting assembly according to claim 1, wherein the plastic member is made of a Bulk Molding Compound (BMC) resin which includes an unsaturated polyester resin and glass fiber.

4. The vehicular lighting assembly according to claim 2, wherein the plastic member is made of a Bulk Molding Compound (BMC) resin which includes an unsaturated polyester resin and glass fiber.

5. The vehicular lighting assembly according to claim 1, wherein the aiming unit is located between the second traveling beam reflector and the second traveling beam lighting assembly attachment.

6. The vehicular lighting assembly according to claim 2, wherein the aiming unit is located between the second traveling beam reflector and the second traveling beam lighting assembly attachment.

7. The vehicular lighting assembly according to claim 3, wherein the aiming unit is located between the second traveling beam reflector and the second traveling beam lighting assembly attachment.

8. The vehicular lighting assembly according to claim 4, wherein the aiming unit is located between the second traveling beam reflector and the second traveling beam lighting assembly attachment.

9. The vehicular lighting assembly according to claim 1, wherein the first traveling beam reflector is a high beam reflector, the second traveling beam lighting assembly attachment is a low beam lighting assembly attachment, and the second traveling beam reflector is a low beam reflector.

10. The vehicular lighting assembly according to claim 2, wherein the first traveling beam reflector is a high beam reflector, the second traveling beam lighting assembly attachment is a low beam lighting assembly attachment, the second traveling beam reflector is a low beam reflector, and the second traveling beam lighting assembly is a low beam lighting assembly.

11. The vehicular lighting assembly according to claim 3, wherein the first traveling beam reflector is a high beam reflector, the second traveling beam lighting assembly attachment is a low beam lighting assembly attachment, and the second traveling beam reflector is a low beam reflector.

12. The vehicular lighting assembly according to claim 4, wherein the first traveling beam reflector is a high beam reflector, the second traveling beam lighting assembly attachment is a low beam lighting assembly attachment, the second traveling beam reflector is a low beam reflector, and the second traveling beam lighting assembly is a low beam lighting assembly.

13. The vehicular lighting assembly according to claim 5, wherein the first traveling beam reflector is a high beam reflector, the second traveling beam lighting assembly attachment is a low beam lighting assembly attachment, and the second traveling beam reflector is a low beam reflector.

14. The vehicular lighting assembly according to claim 6, wherein the first traveling beam reflector is a high beam reflector, the second traveling beam lighting assembly attachment is a low beam lighting assembly attachment, the second traveling beam reflector is a low beam reflector, and the second traveling beam lighting assembly is a low beam lighting assembly.

15. The vehicular lighting assembly according to claim 7, wherein the first traveling beam reflector is a high beam reflector, the second traveling beam lighting assembly attachment is a low beam lighting assembly attachment, and the second traveling beam reflector is a low beam reflector.

16. The vehicular lighting assembly according to claim 8, wherein the first traveling beam reflector is a high beam reflector, the second traveling beam lighting assembly attachment is a low beam lighting assembly attachment, the second traveling beam reflector is a low beam reflector, and the second traveling beam lighting assembly is a low beam lighting assembly.

17. A vehicular lighting assembly for attachment to a vehicle comprising:
   a lighting assembly holder portion including a first traveling beam reflector and a second traveling beam lighting assembly attachment that are integrally formed of plastic;
   a second traveling beam reflector located adjacent the second traveling beam lighting assembly attachment;
   an aiming unit located adjacent the second traveling beam lighting assembly attachment and including at least one pivot projection, wherein the aiming unit is configured for attachment to the vehicle via the at least one pivot projection such that the aiming unit and the second traveling beam lighting assembly attachment are movable with respect to the vehicle via the at least one pivot projection, and the aiming unit is an integral metallic member.

18. The vehicular lighting assembly according to claim 17, wherein the lighting assembly holder portion is made of a Bulk Molding Compound (BMC) resin which includes an unsaturated polyester resin and glass fiber.

19. The vehicular lighting assembly according to claim 17, wherein the aiming unit is located between the second traveling beam reflector and the second traveling beam lighting assembly attachment.

20. The vehicular lighting assembly according to claim 17, wherein the at least one pivot projection includes a pair of ball joints.

* * * * *